United States Patent
Boselli et al.

(10) Patent No.: US 7,909,676 B2
(45) Date of Patent: Mar. 22, 2011

(54) INDEPENDENT MEASURING APPARATUS FOR GRINDING MACHINES

(75) Inventors: Giovanni Boselli, Milan (IT); Giovanni Guido Maria Bavestrelli, Milan (IT); Flavio Stefano Bianchessi, Milan (IT); Claudio Trevisan, Milan (IT)

(73) Assignee: Techint Compagnia Tecnica Internazionale S.p.A., Milan (IT)

( * ) Notice: Subject to any disclaimer, the term of this patent is extended or adjusted under 35 U.S.C. 154(b) by 0 days.

(21) Appl. No.: 11/988,989

(22) PCT Filed: Jul. 26, 2006

(86) PCT No.: PCT/EP2006/007398
§ 371 (c)(1),
(2), (4) Date: Jul. 17, 2008

(87) PCT Pub. No.: WO2007/017120
PCT Pub. Date: Feb. 15, 2007

(65) Prior Publication Data
US 2008/0299872 A1    Dec. 4, 2008

(30) Foreign Application Priority Data
Jul. 27, 2005    (IT) ............................... MI2005A1452

(51) Int. Cl.
*B24B 49/00* (2006.01)
(52) U.S. Cl. ............................................. 451/8; 451/9

(58) Field of Classification Search .................. 451/5, 8, 451/9, 49
See application file for complete search history.

(56) References Cited

U.S. PATENT DOCUMENTS

| | | | | |
|---|---|---|---|---|
| 4,596,076 A * | 6/1986 | Sigg | ................................ | 33/555 |
| 4,811,524 A * | 3/1989 | Corallo | ............................. | 451/9 |
| 4,903,413 A * | 2/1990 | Bellwood | ........................ | 33/551 |
| 5,077,908 A * | 1/1992 | Moore | ............................. | 33/550 |
| 5,088,207 A * | 2/1992 | Betsill et al. | ................. | 33/555.3 |
| 5,337,485 A * | 8/1994 | Chien | ............................. | 33/550 |
| 6,754,973 B2 * | 6/2004 | Takahashi | ....................... | 33/551 |
| 7,159,477 B2 * | 1/2007 | Edwin et al. | ................. | 73/865.8 |
| 7,461,462 B2 * | 12/2008 | Bankestrom et al. | ........... | 33/550 |
| 7,472,490 B2 * | 1/2009 | Kube et al. | .................... | 33/555.1 |

FOREIGN PATENT DOCUMENTS

WO    WO 03/102496 A1    12/2003
WO    WO 2006/084072 A1    8/2006

* cited by examiner

*Primary Examiner* — Maurina Rachuba
(74) *Attorney, Agent, or Firm* — Hedman & Costigan, P.C.; James V. Costigan

(57) ABSTRACT

Measuring apparatus (50) of geometrical parameters of cylinders, rolls and similar elements (11), used for the rolling of flat products operating on a machine for the grinding of said cylinders with an autonomous movement, i.e. with a movement independent of the translation movement of the grinding wheel or other parts, characterized in that it comprises at least four sensors (54, 55), situated on a surface orthogonal to the cylinder (11) or roll and in that at least two of said sensors are situated in opposite positions.

5 Claims, 1 Drawing Sheet

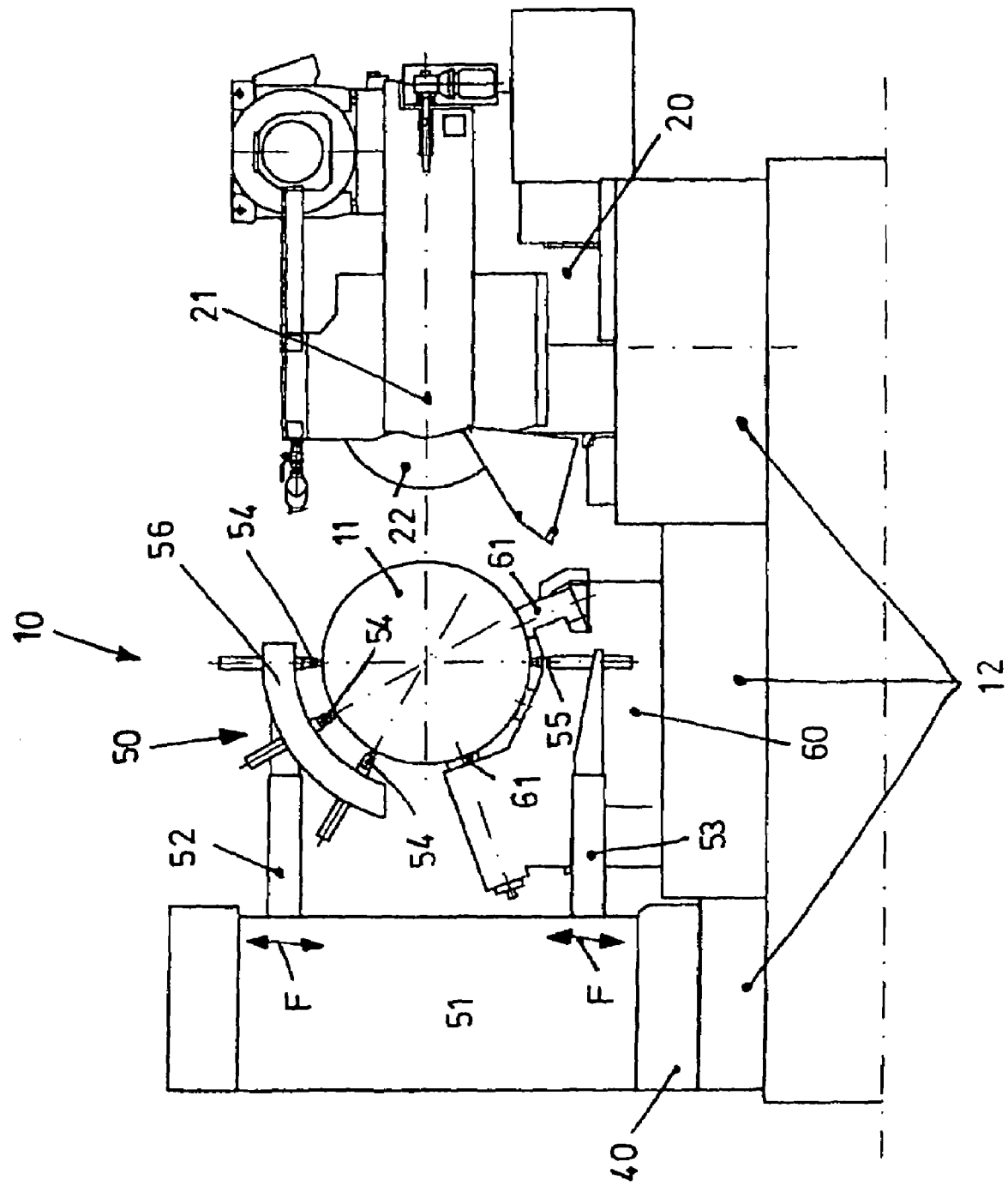

INDEPENDENT MEASURING APPARATUS FOR GRINDING MACHINES

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISK

Not Applicable

REFERENCE TO A MICROFICHE APPENDIX

Not Applicable

The present invention relates to an independent measuring apparatus for grinding machines.

BACKGROUND OF THE INVENTION

I. Field of the Invention

In particular, the invention relates to a measuring apparatus for cylinders, rolls and similar elements to be measured during the grinding operation, equipped with detection systems of the geometrical and dimensional characteristics (for example roundness, shape, diameter, etc.) and/or structural characteristics (for example, the presence of cracks and work hardening, measurement of the hardness, etc.) and/or surface characteristics (for example roughness, states of surface tension, etc.).

II. Description of Related Art

Grinders of cylinders coming from rolling mills, for the production of strips of metallic material, are large dimensional machines which must guarantee high performances in terms of repeatability and accuracy of the measurements effected in addition to precision in revealing the geometrical shapes obtained.

These characteristics relating to precision, surface quality and repeatability to be guaranteed on a wide range of dimensions (in diameter—up to and over 2 m—and in length—up to and over 10 m), are required in a whole range of sectors in addition to the rolling of flat metallic and non-metallic products, such as the paper and printed paper industry, the constructions of engines and large dimensional hydraulic systems, for example pistons, transmission shafts and elbow shafts for marine engines.

The use of these machines is generally indispensable whenever the large dimensions of elements are associated with sophisticated and restrictive geometrical and surface characteristics as well as structural integrity.

In the iron and steel industry, for example, it is common practice for the reconditioning operations of cylinders from rolling mills to be effected in areas adjacent to the rolling mill itself called "cylinder shapers" or in workshops dedicated to the service of various rolling mills. In these spaces, worn and/or damaged cylinders converge to be subjected to a grinding phase suitable for restoring the ideal conditions necessary for the rolling process.

Even tiny variations in the theoretical profile and roundness of the rolling cylinders cause undulations in the strips, surface marks and traces which reduce the commercial value of tons of steel, with obvious damage to the plant which produces and commercializes them. Furthermore, deviations in the roughness requested cause problems in the subsequent surface protection phases of the strip. Finally, small surface defects (such as, for example cracks, work hardening etc.) jeopardize the structural integrity of the cylinder increasing the risk of accidents (for example catastrophic breakages) causing production blockages and enormous repair expenses, naturally also in addition to the most important aspect linked to the safety of the operators.

In order to optimize the reconditioning procedure of the cylinder, it is necessary to measure and subsequently correct its geometry during the grinding process. At the same time, it is necessary to identify the entity and position of defects in order to effect suitable grinding actions for eliminating them.

The present state of the art defines two alternative solutions for measuring these cylinders:

in the paper industry systems have been developed based on 4 points capable of giving an excellent qualitative response with respect to the determination of the roundness characteristics of the cylinder. This solution, however, has the limitation of being assembled on the wheel-holder trolley and consequently operating in synchronization therewith. This implies that, with respect to the quality of the detection, the geometrical measurements and dimensions are satisfactory but cannot be effected during the grinding cycle whereas the structure and surface faults are subject to sampling. The various dimensions of the grinding wheel and sensors envisage that the measurement coil be of a lesser width than that generated by the grinding wheel, making it impossible for the sensor to cover the whole area to be analyzed. As this is consequently a non-exhaustive measurement, an identification of all the faults is not guaranteed;

in the iron and steel industry, on the contrary, alongside the synchronous "traditional" measurement methods (gauge assembled on board the wheel-holder trolley) but with a geometrical and dimensional analysis effected with two sensors which have the same limitations described above, solutions have been developed based on asynchronous detection methods (independent gauge) which operate on two points to effect geometrical and dimensional measurements (shape, profile, diameter, etc.).

Regulations (for example ISO 4292) establish that a complete and exhaustive measuring of the roundness must be carried out with two measurements on three points and one on two points and that these determinations must be effected independently of each other. It is therefore evident that the procedure and equipment currently on the market are not capable of providing exhaustive measurements. These apparatuses, on the other hand, are perfectly adequate for determining the structural and surface characteristics, as an asynchronous system adapts the pitch of the coil with the dimension of the sensors.

In the "traditional" cycle (synchronous), three phases are necessary for obtaining an exhaustive analysis of the whole processing area:

passage of the grinding wheel, geometrical and dimensional and, optionally, structural control, definition of the new processing parameters.

These operations must be carried out sequentially increasing the cycle time required.

Furthermore, the fact of operating in different times, induces possible errors due to variations in the configuration of the system as a result of accidental events between the two passages.

BRIEF SUMMARY OF THE INVENTION

A general objective of the present invention is therefore to provide a measurement apparatus for grinding machines suitable for overcoming the above drawbacks of the known art described above by introducing the measurement of the geometrical characteristics with 4 detection points which, among other things, responds to the requisites defined in the ISO regulations and operating, together with "structural" and/or "surface" sensors, on an asynchronous movement system.

This system is therefore also capable of operating contemporaneously with the grinding of the cylinder.

In view of the above objectives, according to the present invention, an independent measuring apparatus has been conceived for grinding machines, in particular a measuring apparatus for cylinders, rolls and the like, to be subjected to grinding, equipped with geometrical and/or dimensional and/or structural and/or surface control organs having the characteristics specified in the following claims.

BRIEF DESCRIPTION OF THE DRAWING

The drawing shows a diagram of a grinding machine for cylinders, rolls and similar elements.

The morphological and functional characteristics of the present invention as also its advantages with respect to the known art will appear more evident from the following description, referring to the enclosed FIGURE which offers a non-limiting example of the invention and which schematically illustrates an independent measuring apparatus for grinding machines produced according to the innovative principles of the invention itself.

DETAILED DESCRIPTION OF THE INVENTION

With reference to the FIGURE, a grinding machine 10 for cylinders 11, rolls and similar elements comprises at least one base 12 along which a grinding trolley 20, carrying the grinding unit 21 equipped with a grinding wheel 22, and a supporting trolley 40 of the independent gauge carrying a measuring apparatus 50, are moveably supported.

The measuring and detection apparatus 50 of the geometry of the cylinder 11 is used not only for cylinders coming from the rolling mill, to obtain strips made of metallic material, but also in other sectors comprising grinding processing of cylinders, rolls and other similar elements for the paper industry and, more generally, of flat non-ferrous rolled sections and/or fields such as the construction of marine engines and/or large dimensional hydraulic systems.

The measuring and detection apparatus 50 is therefore assembled on an independent system, the measuring trolley 40, and, as a first specific characteristic, is produced with a structure 51 similar to tongs, equipped with at least one upper arm 52 carrying upper sensors 54 and a lower arm 53, carrying at least one lower sensor 55.

The measuring apparatus comprises at least four sensors and two arms.

This tong-like structure is designed to be opened/closed, by the translation and/or rotation of at least one of the arms 52, 53, in the direction indicated with the arrow F, so as to come into contact with the cylinder 11 during the measuring phase, at the same time, allowing it to be loaded and unloaded at the end of the processing.

The measuring apparatus 50 also has sensors 54, 55 positioned so as to effect a simultaneous measuring in at least four points, without any interference on the part of the grinding unit.

In particular, the upper sensors 54 are arranged along a suitable support 56 and are radially positioned on a perpendicular plane with respect to the axis of the cylinder 11 being processed.

One of the remaining sensors or lower detection points 55, also radial, can be situated in a diametrally opposite position to one of the positions of the upper sensors 54 of the support 56 and consequently also on a perpendicular plane with respect to the axis of the cylinder being processed in order to guarantee a direct reading of the diameter of the cylinder 11.

In other words, the measuring system according to the invention operating on a machine for the grinding of said cylinders with an autonomous movement, i.e. with a movement independent of the translation movement of the grinding wheel or other parts, comprises at least four sensors (54, 55), situated on a plane orthogonal to the cylinder (11) or roll and two of said sensors can be situated in positions diametrally opposite to each other.

The sensors are therefore positioned on at least two arms 52, 53 equipped with automatic movement means which allow the sensors 54, 55 to approach and be roughly positioned on the surface of the cylinder 11.

The fine regulation is then managed by directly using the signals coming from the sensors.

In addition to the sensors 54, 55 cited above, it is also possible to add detection systems of structural faults, such as parasite, currents and/or ultrasounds and/or durometers, and/or rugosimeters and similar systems for determining the surface characteristics.

This structural and/or surface analysis system is envisaged as being installed on the structure of the independent gauge 51 or on another dedicated structure, again situated on board the independent gauge.

Suitable rest supporting structures 60 carrying skids 61 are also envisaged on the base 12 to support the cylinder being processed.

The system obviously functions even if the cylinder is supported between the grinding points (centres), without any help of rests.

The presence of the sensors 54, 55 advantageously enables, if assisted by a specific algorithm implemented in the automatic management system of the grinding machine 10 and a suitable measurement strategy, the complete characterization of the roundness.

This allows a complete geometrical plotting of the cylinder 11, producing a base on which the subsequent grinding operations can be optimized by means of a suitable information processing and feedback system on the processing parameters of the grinding wheel adjusting the roundness, profile, diameter and conicity of the ground cylinders.

The invention claimed is:

1. A measuring apparatus for measuring geometrical parameters of cylinders or rolls and operating with an autonomous movement on a machine for the grinding of said cylinders or rollers, wherein said autonomous movement is independent of the translation movement of the grinding wheel or other parts of said grinding machine, said measuring apparatus comprises an independent gauge system that comprises at least four sensors radially positioned on a plane perpendicular with respect to the axis of the cylinder or roll being processed, at least two of said sensors being situated in positions which are diametrically opposite each other, wherein said sensors are positioned on an upper arm and a lower arm which are movable so as to allow said sensors to be orthogonally positioned with respect to the surface of the cylinders or rolls, said upper arm carrying at least three upper sensors which are radially arranged along one and the same support carried by said upper arm and said lower arm carrying at least one lower sensor that is positioned diametrically opposite to at least one of said three upper sensors, and wherein said upper arm and said lower arm are part of a tong-like structure that is assembled on a measuring trolley, said tong-like structure being opened and closed, by the translation and/or rotation of at least one of said upper and lower arms, so as to come into contact with the cylinder or roll during the measuring phase and to allow the loading and/or unloading of the cylinders and rolls.

2. A measuring apparatus according to claim 1 further comprising a detection system of structural and/or surface faults of the cylinders or rolls, said detection system being positioned on said tong-like structure and comprising parasite currents and/or ultrasounds and/or rugosimeters and/or durometers.

3. A grinding machine for cylinders or rolls, characterized in that it comprises a measuring apparatus according to one of claims 1 or 2.

4. A grinding machine for cylinders or rolls, characterized in that it comprises at least one base along which a grinding trolley, carrying a grinding unit provided with a grinding wheel, and a supporting trolley carrying a measuring apparatus according to one of claims 1 or 2, are moveably supported.

5. A grinding machine for cylinders or rolls, characterized in that it comprises a measuring apparatus according to one of claims 1 or 2 and in that it further comprises an automatic management system which implements the measuring procedure for the complete geometrical plotting and the complete characterization of the roundness of the cylinder or roll.

\* \* \* \* \*